United States Patent [19]
Hermann

[11] Patent Number: 5,839,141
[45] Date of Patent: *Nov. 24, 1998

[54] FISHERMAN'S TOOL

[76] Inventor: James R. Hermann, 309 SE. 172nd, Portland, Oreg. 97233

[ * ] Notice: This patent issued on a continued prosecution application filed under 37 CFR 1.53(d), and is subject to the twenty year patent term provisions of 35 U.S.C. 154(a)(2).

[21] Appl. No.: 774,617

[22] Filed: Dec. 30, 1996

[51] Int. Cl.$^6$ ....................................................... B25F 1/00
[52] U.S. Cl. ................... 7/106; 43/1.4; 81/426
[58] Field of Search ................... 7/106; 81/418, 81/426, 427; 43/1.4

[56] References Cited

U.S. PATENT DOCUMENTS

| 2,653,332 | 9/1953 | Precious | 7/106 |
| 3,808,915 | 5/1974 | Bonnel | 7/106 X |
| 3,956,950 | 5/1976 | Jamell | 81/426 |
| 4,149,435 | 4/1979 | Smith | 81/426 |
| 4,208,749 | 6/1980 | Hermann et al. | 7/106 |
| 4,607,548 | 8/1986 | Anderson | 81/427 |

Primary Examiner—James G. Smith
Attorney, Agent, or Firm—Chernoff, Vilhauer, McClung & Stenzel, LLP

[57] ABSTRACT

A modified pair of needlenose pliers adapted for opening split rings and for forming spinner loops.

6 Claims, 2 Drawing Sheets

FISHERMAN'S TOOL

BACKGROUND OF THE INVENTION

Conventional needlenose pliers are often used by fisherman for grasping and holding hooks and lures and for cutting wire, leader, fishing line and lead. An improved design in needlenose pliers specifically aimed at fisherman is shown in my U.S. Pat. No. 4,208,749, the design incorporating a punch in the pliers' jaws and a circular cutter either in the jaws or between the handles, the punch permitting the user to form a hole in lead weights, and the circular cutter permitting a cut of hollow core lead without crimping it shut. However neither tool is adapted to permit the easy opening of split rings for a change of hooks nor the fabrication of spinner loops, both of these tasks best being performed at the fishing site so as to allow quick adaptation to fishing conditions and to the game fish being sought. The present invention fills these needs and others that will become apparent from the detailed description herein.

BRIEF SUMMARY OF THE INVENTION

The invention comprises an improved design of needlenose pliers that have been modified to convert one jaw of the pliers into a substantially cone-shaped jaw suitable both for grasping and for service as an anvil for fabrication of wire spinner loops and by the addition of a hooked "snout-like" tip on the other jaw that over-laps the other jaw and that permits the opening of the smallest split rings available.

DETAILED DESCRIPTION OF THE INVENTION

Figure 1:
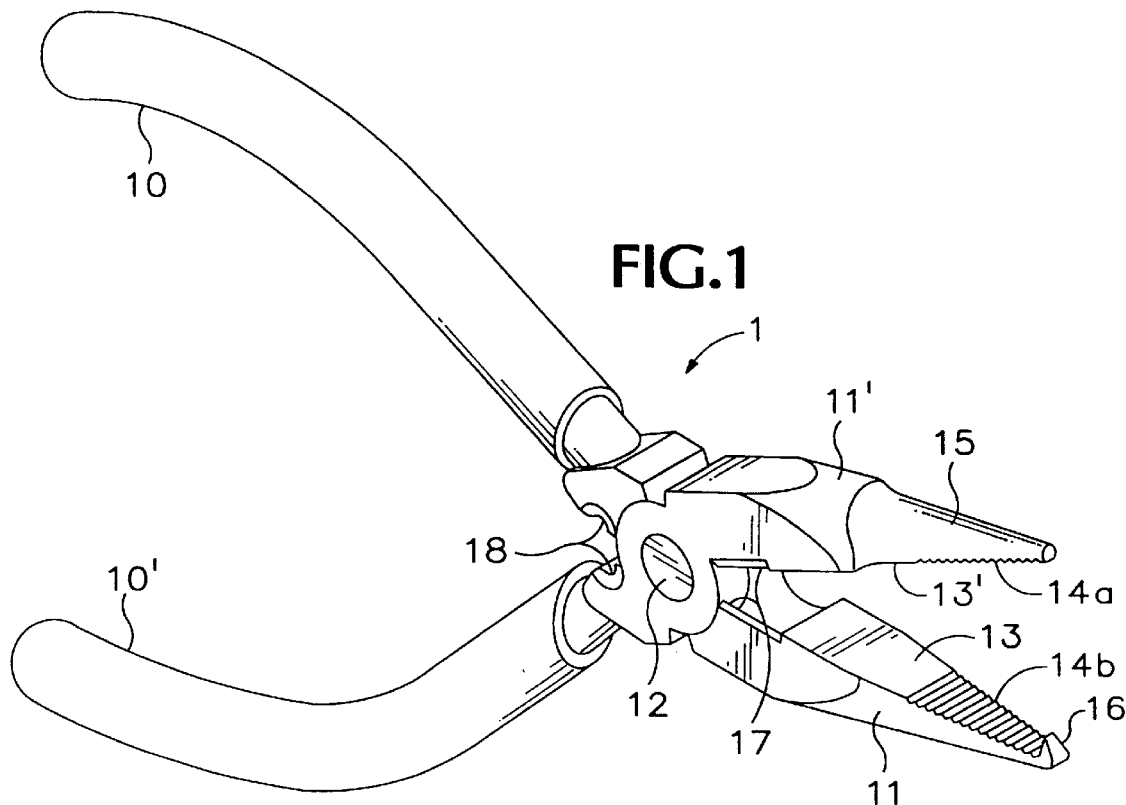
FIG. 1 is a perspective view of an exemplary embodiment of the fisherman's tool of the present invention.
Figure 2:
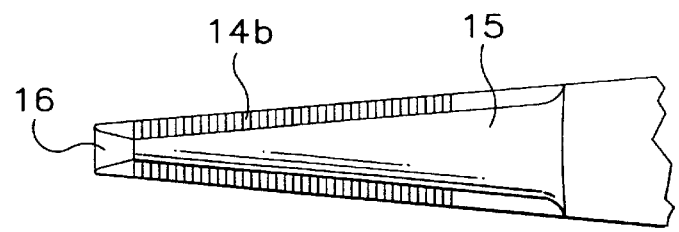
FIG. 2 is a plan view of the tool shown in FIG. 1.
Figure 3:
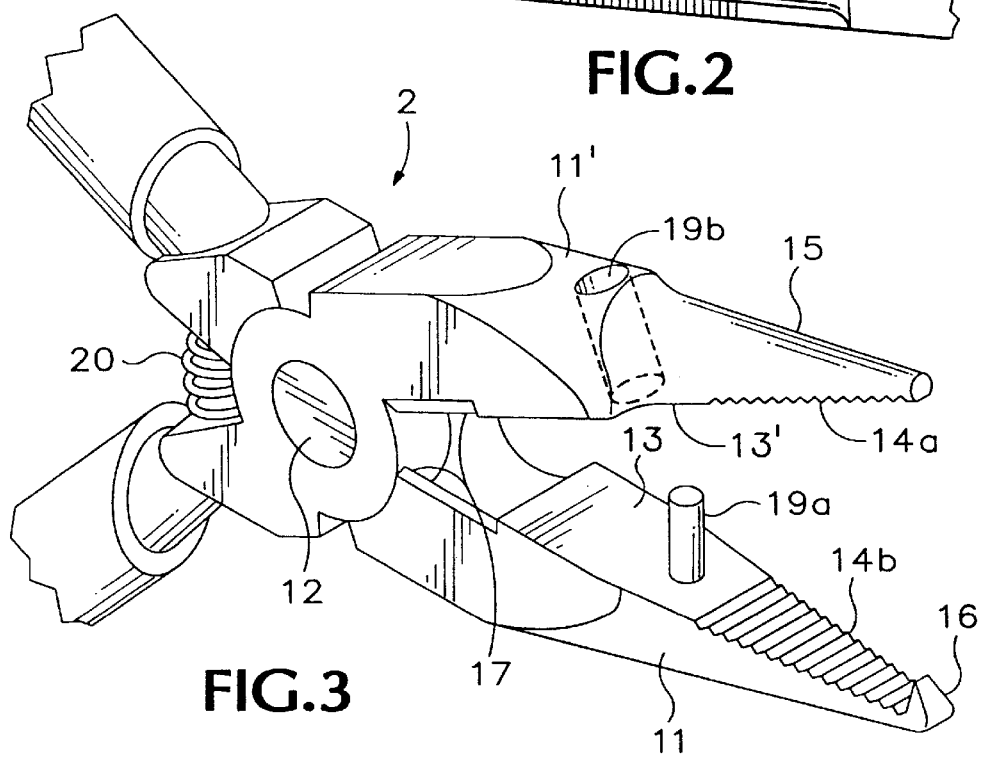
FIG. 3 is a perspective view of another exemplary embodiment of the fisherman's tool of the present invention.

Referring to the drawings, wherein like numerals refer to the same elements, there is shown in FIG. 1 and 2 a fisherman's tool 1 comprising modifications in the design of a pair of conventional needlenose pliers. Conventional needlenose pliers comprise first and second intersecting members pivotable at their intersection 12, the first and second intersecting members each comprising a handle 10, 10' and a tapered jaw 11, 11', each tapered jaw including a substantially planar gripping surface that comprises a smooth portion 13, 13' near the intersection 12 and a scored portion 14b near the pointed end of the tapered jaw.

The improvements of the present invention comprise: (a) a rounded and tapered first jaw 15 having a scored gripping surface 14a and a reduced cross-sectional area relative to the second jaw wherein the shape of the first jaw is a cone having its base nearest the intersection 12 and being truncated along its vertical axis so that the truncation substantially coincides with the scored portion 14a of the first jaw; and (b) a hooked tip 16 on the second of the tapered jaws 11, the hooked tip being oriented at approximately right angles to the gripping surface and overlapping the rounded and tapered first jaw 15. In an especially preferred embodiment, the hooked tip is tapered both in the planes coinciding with the side of the jaw 11 and from the base of the tip to its point.

Conventional features such as a straight edge cutter 17 may be included in the jaws 11 and 11', as well as a circular cutter 18 formed into the handles 10 and 10' near the pivot 12, the latter being formed preferably by the method set forth in my U.S. Pat. No. 4,208,749 at column 4, which is incorporated herein by this reference. Other conventional features which may be included are a spring 20 between the handles 10 and 10' near the pivot 12, the spring bridging the jaws of the pliers open, as well as a punch comprising a cylindrical pin 19a in jaw 11 and a corresponding die hole 19b in jaw 11'.

Figure 4A:
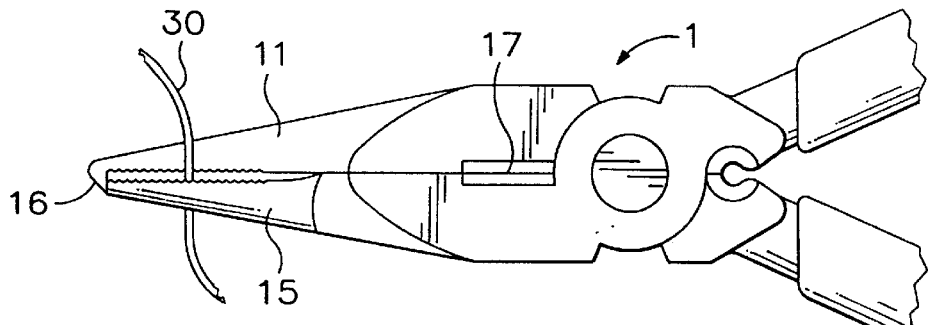
FIG. 4A is a side view of the tool shown in FIG. 1.
Figures 4B, 4C:
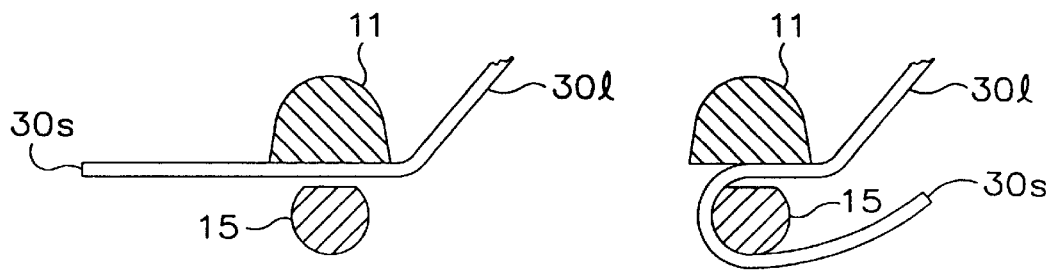
FIG. 4B–4F are sectional views taken through the plane A—A of FIG. 4A, showing how the tool is used to form a fisherman's spinner loop.
Figures 4D, 4E, 4F:
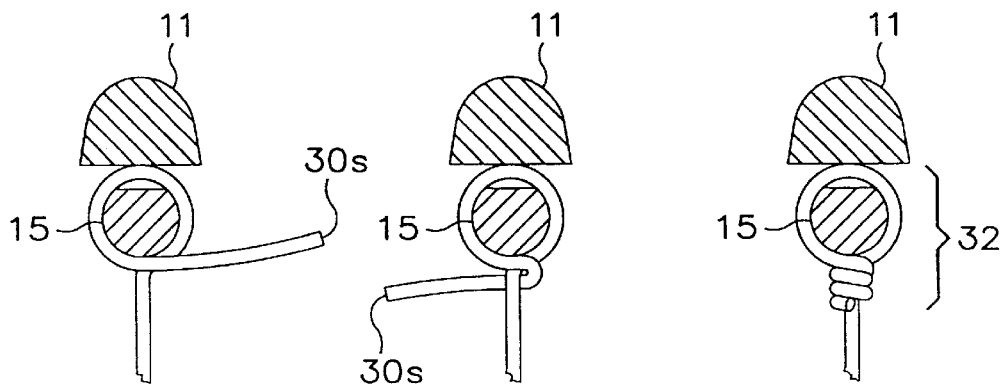

Referring to FIG. 4A–4F, there is shown a series of steps that may be taken with the tool of the present invention to fabricate spinner loops. First, a wire 30 is grasped between grounded and tapered jaw 15 and corresponding jaw 11 at a point from the end of the wire 30 where there is sufficient wire to form a proper size loop; typically for a standard-sized loop this will be about 2 inches from the end of the wire 30. Next, with the wire still grasped between jaws 11 and 15, the long end of the wire 30l may be bent upwardly to begin formation of a loop, shown in FIG. 4B. In FIG. 4C, the short end of the wire 30s is bent around and tapered jaw 15 to form part of a loop. Next, as shown in FIG. 4D, either the wire is rotated around jaw 15 or the wire is held stationary while the pliers are rotated, to complete the loop. Finally, as seen in FIG. 4E and 4F, the short end of the wire 30s is twisted around the neck portion of the loop and trimmed as necessary to form a completed loop 32.

Figure 5:
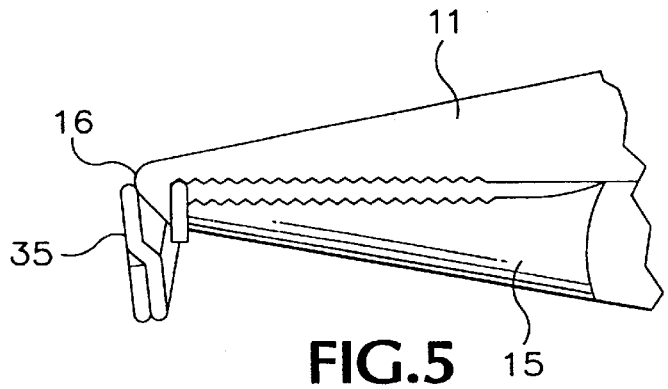
FIG. 5 is a close-up side view of FIG. 4A showing how the tool is used to open a fisherman's split ring to change hooks.

Referring to FIG. 5, the utility of the tool of the present invention for opening a split ring 35 is demonstrated. There, one of the two rings forming the split ring is grasped between jaws 15 and 11 at the same time as hooked tip 16 is inserted into the split in the ring 35. The taper of the hooked tip 16 together with forces exerted on the ring from jaws 15 and 11 combine to force the split ring open and permit removal of one size hook and replacement of the hook removed with a hook of another size. The tool has been found to be usable on any size split ring, including No. 1, which is the smallest split ring currently available.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A fisherman's tool comprising an improved pair of needlenose pliers comprising first and second intersecting members pivotable at their intersection, said intersecting members comprising a first handle and a first tapered jaw mounted on said first intersecting member and a second handle and a second tapered jaw mounted on said second intersecting member, said first and second tapered jaws each including a substantially planar gripping surface that comprises a smooth portion near said intersection and a scored portion near the pointed end of said tapered jaw, the improvement comprising:

(a) said first jaw being substantially conical and having a reduced cross-sectional area near the pointed end of said first tapered law relative to the corresponding portion of said second tapered jaw; and (b) a hooked tip on said second tapered jaw, said hooked tip being substantially triangular in cross-section and oriented at approximately right angles to said gripping surface and overlapping said first tapered jaw.

2. The tool of claim 1, including a straight edge cutter formed into said first and second jaws.

3. The tool of claim 1, including a circular cutter formed into said first and second handles.

4. The tool of claim 1, including a punch formed into said first and second jaws.

5. The tool of claim 4 wherein said punch comprises a cylindrical pin and a corresponding die hole for receiving said pin.

6. The tool of claim 1, including a spring between said first and second jaws, said spring urging said jaws open.

* * * * *

UNITED STATES PATENT AND TRADEMARK OFFICE
CERTIFICATE OF CORRECTION

PATENT NO.    : 5,839,141
DATED         : November 24, 1998
INVENTOR(S)   : James R. Hermann It is certified that error appears in the above-identified patent and that said Letters Patent is hereby corrected as shown below:

Column 3, claim 1,
Line 1, section (a), change "tapered law relative" to -- tapered jaw relative --

Signed and Sealed this

Ninth Day of April, 2002

Attest:

Attesting Officer

JAMES E. ROGAN
Director of the United States Patent and Trademark Office